United States Patent
Miyoshi et al.

(10) Patent No.: US 12,427,863 B2
(45) Date of Patent: Sep. 30, 2025

(54) VEHICLE DISPLAY DEVICE

(71) Applicants: YAZAKI CORPORATION, Tokyo (JP); TOYOTA JIDOSHA KABUSHIKI KAISHA, Toyota (JP)

(72) Inventors: Yuki Miyoshi, Makinohara (JP); Yasuhiro Katsumata, Makinohara (JP); Akira Yamanaka, Makinohara (JP); Hiroshi Sano, Makinohara (JP); Yoshihide Takada, Makinohara (JP); Takahiro Osawa, Shimada (JP); Tetsuya Suganuma, Shimada (JP); Yu Kobayashi, Shimada (JP); Makoto Fujii, Toyota (JP); Koichi Kase, Toyota (JP); Shuhei Yamaguchi, Toyota (JP); Tadashi Okubo, Toyota (JP); Ryosuke Tsuchite, Kariya (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 110 days.

(21) Appl. No.: 18/599,204

(22) Filed: Mar. 8, 2024

(65) Prior Publication Data
US 2024/0308341 A1 Sep. 19, 2024

(30) Foreign Application Priority Data
Mar. 13, 2023 (JP) .................................. 2023-038238

(51) Int. Cl.
*B60K 35/231* (2024.01)

(52) U.S. Cl.
CPC ...... *B60K 35/231* (2024.01); *B60K 2360/334* (2024.01); *B60K 2360/691* (2024.01); *B60K 2360/785* (2024.01)

(58) Field of Classification Search
CPC ............ B60K 35/231; B60K 2360/334; B60K 2360/691; B60K 2360/785;
(Continued)

(56) References Cited

U.S. PATENT DOCUMENTS

| 11,745,586 B2 * | 9/2023 | Ichikawa ............... B60K 35/23 |
| | | 359/630 |
| 2006/0046549 A1 * | 3/2006 | Sakaguchi .......... B60R 11/0235 |
| | | 439/259 |

(Continued)

FOREIGN PATENT DOCUMENTS

JP 2014-174416 A 9/2014

*Primary Examiner* — Richard M Camby
(74) *Attorney, Agent, or Firm* — KENEALY VAIDYA LLP

(57) ABSTRACT

A vehicle display device includes a housing that includes an opening and a first wall, in which the housing is attached to a vehicle in an orientation in which the opening faces an upper side in a vertical direction of the vehicle, and the first wall faces a rear side in a front-rear direction of the vehicle, an image display device, and a transparent cover. The first wall includes a pinch part pinched by one hand of an operator. The pinch part includes a first recessed portion and a second recessed portion, which are spaced apart from each other. The first recessed portion is recessed toward the second recessed portion. The second recessed portion is recessed toward the first recessed portion.

7 Claims, 14 Drawing Sheets

(58) Field of Classification Search
CPC ........ B60K 2360/688; B60K 2360/693; B60K 35/60; B60K 35/50; B60K 2360/96; B60K 35/23; G02B 27/0149
See application file for complete search history.

(56) References Cited

U.S. PATENT DOCUMENTS

| | | | |
|---|---|---|---|
| 2014/0268359 A1 | 9/2014 | Yuki et al. | |
| 2018/0370362 A1* | 12/2018 | Watanabe | B60K 35/22 |
| 2019/0146218 A1* | 5/2019 | Yamazoe | G02B 27/0101 |
| | | | 359/631 |
| 2022/0214542 A1* | 7/2022 | Fang | G02F 1/133528 |
| 2023/0415572 A1* | 12/2023 | Yamada | G02B 27/0149 |

* cited by examiner

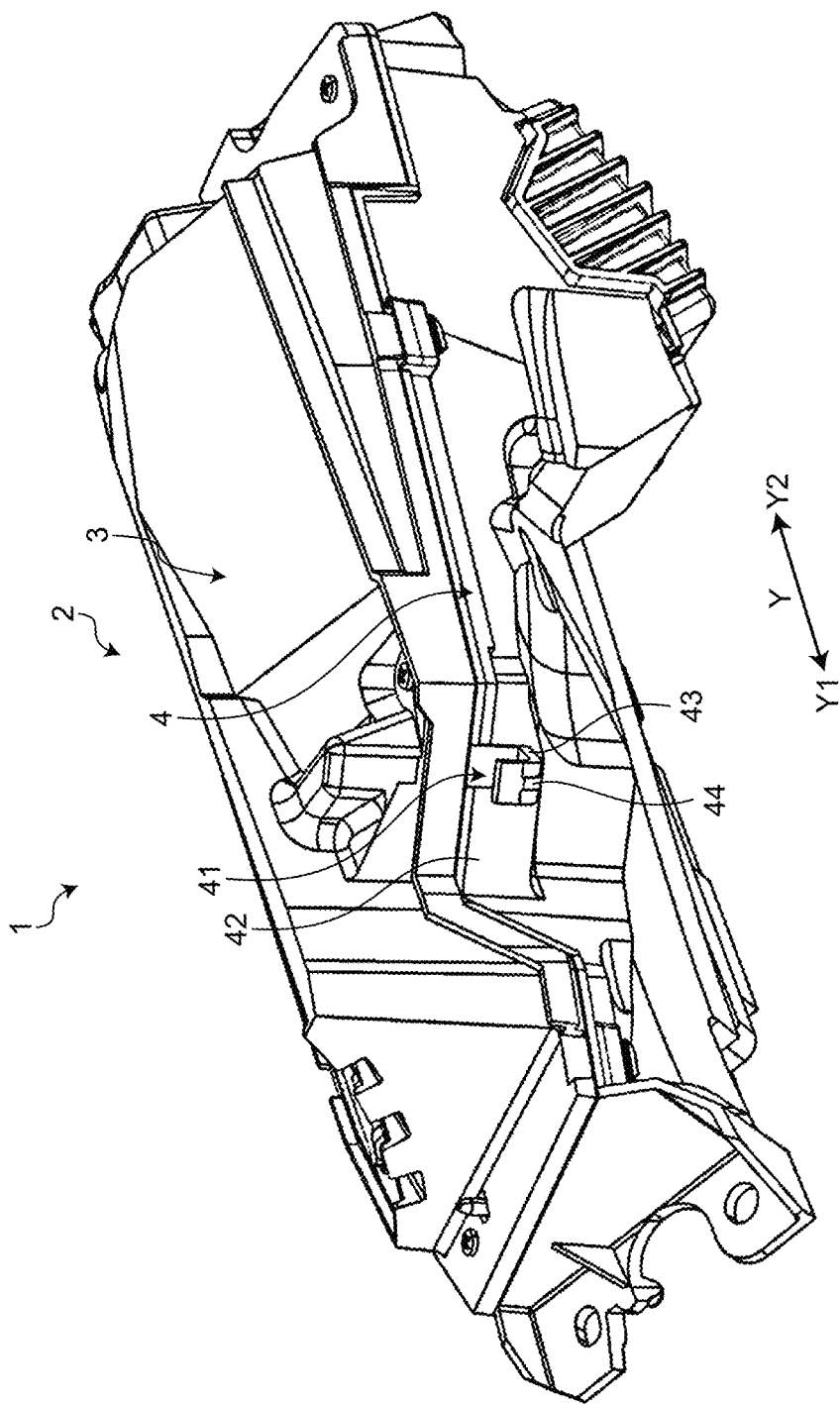

VEHICLE DISPLAY DEVICE

CROSS-REFERENCE TO RELATED APPLICATION (S)

The present application claims priority to and incorporates by reference the entire contents of Japanese Patent Application No. 2023-038238 filed in Japan on Mar. 13, 2023.

BACKGROUND OF THE INVENTION

1. Field of the Invention

The present invention relates to a vehicle display device.

2. Description of the Related Art

Conventionally, vehicle display devices have been provided. Japanese Patent Application Laid-open No. 2014-174416 discloses a head-up display device including a housing, an image light emitter that is disposed in the housing and emits image light representing an image, and a mirror that is disposed in the housing and reflects the image light to display the image light as a virtual image in a front visual field of a user outside of the housing.

It is desirable to enable the improved workability during the attachment of a housing of a vehicle display device to a vehicle. For example, in a case in which an operator can grasp the housing stably with one hand, the workability of an attachment work is improved.

SUMMARY OF THE INVENTION

The purpose of the present invention is to provide a vehicle display device that can improve the workability during the installation of a housing to a vehicle.

In order to achieve the above mentioned object, a vehicle display device according to one aspect of the present invention includes a housing that includes an opening and a first wall, wherein the first wall is attached to a vehicle in an orientation in which the opening faces an upper side in a vertical direction of the vehicle, and the first wall faces a rear side in a front-rear direction of the vehicle; an image display device that is housed in the housing; and a transparent cover that blocks the opening and allows display light emitted from the image display device to be transmitted from an inside to an outside of the housing, wherein the first wall includes a pinch part pinched by one hand of an operator, the pinch part includes a first recessed portion and a second recessed portion, which are spaced apart from each other in one direction along the first wall, the first recessed portion is recessed toward the second recessed portion along the one direction, and the second recessed portion is recessed toward the first recessed portion along the one direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a diagram illustrating a hook part according to the modification.

DETAILED DESCRIPTION OF THE PREFERRED EMBODIMENTS

Hereinbelow, a vehicle display device according to embodiments of the present invention will be described in details with reference to the drawings. The present invention is not limited to the embodiments. The components in the following embodiments include those that can be readily assumed by those skilled in the art or are substantially the same.

Embodiment

Figure 1:
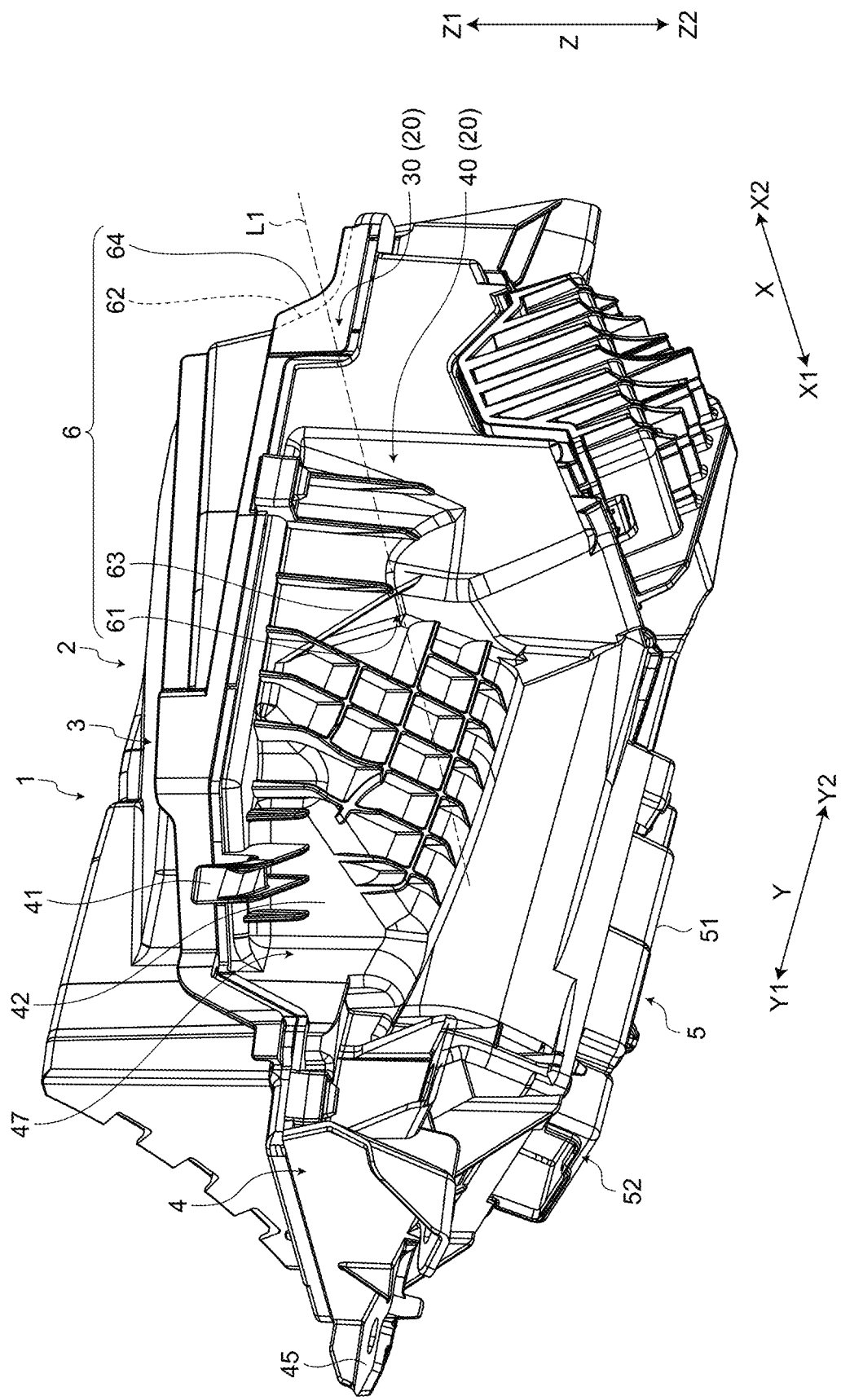
FIG. 1 is a perspective view illustrating a vehicle display device according to an embodiment.
Figure 2:
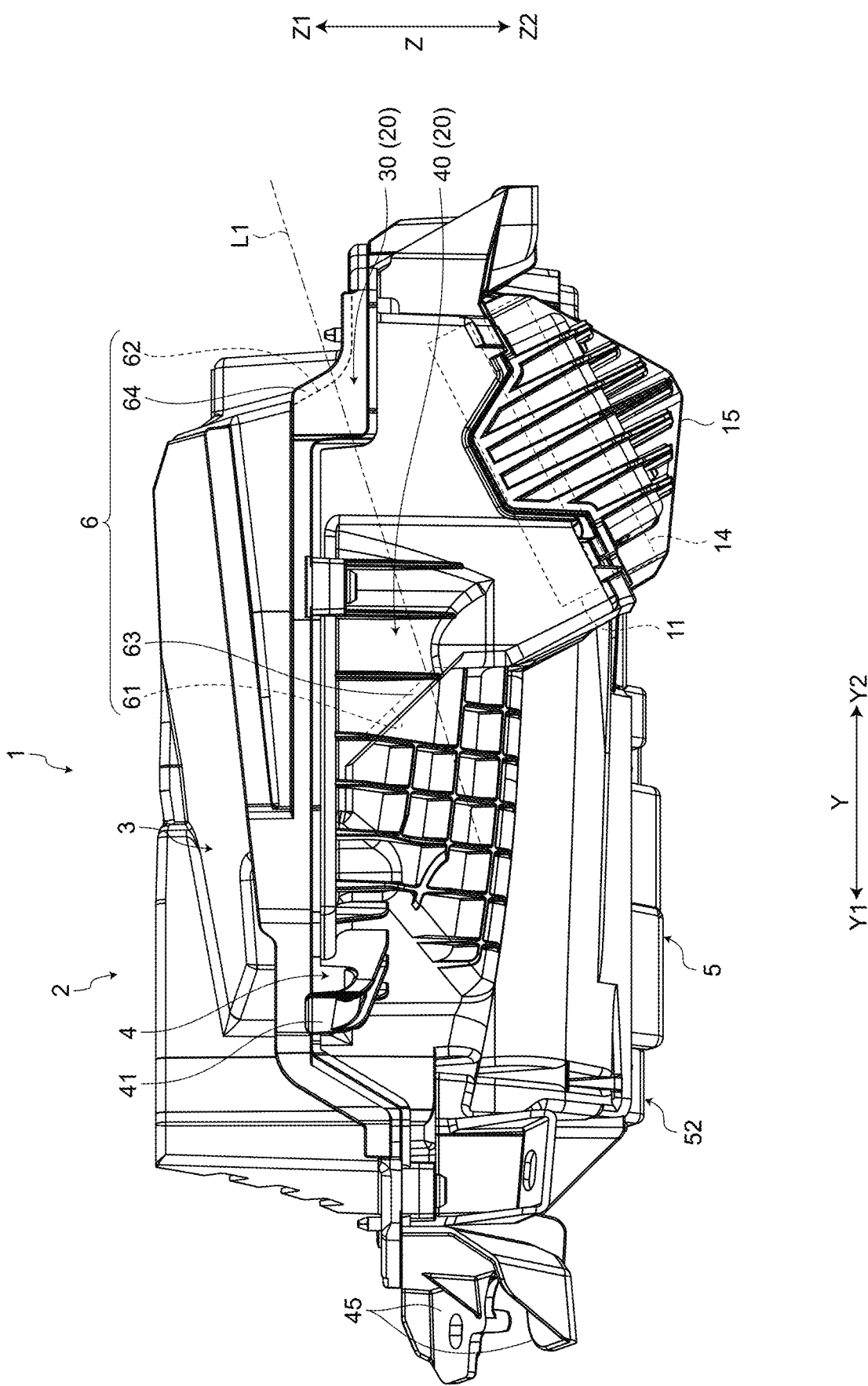
FIG. 2 is a front view illustrating the vehicle display device according to the embodiment.
Figure 3:
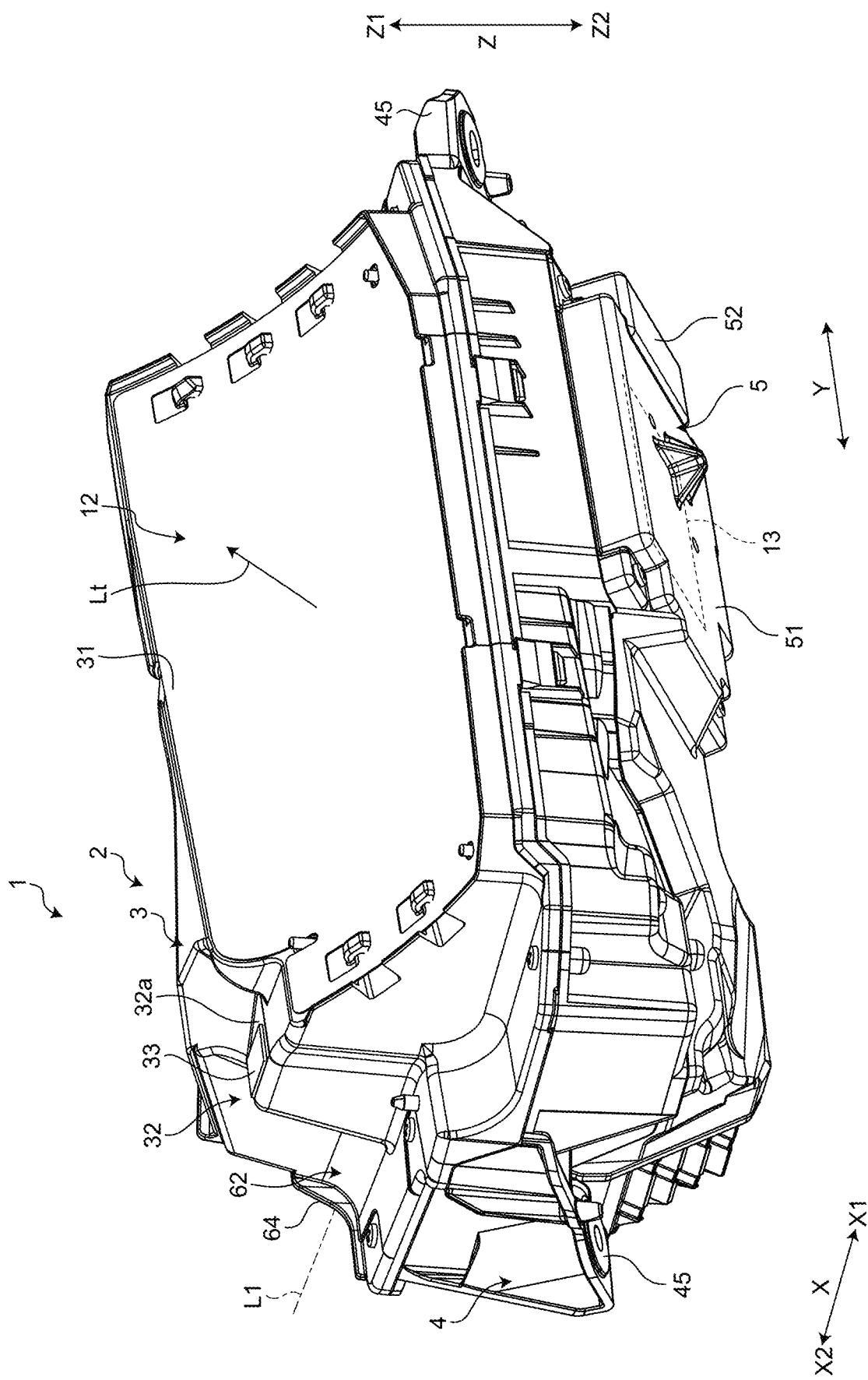
FIG. 3 is a perspective view illustrating the vehicle display device according to the embodiment.
Figure 4:
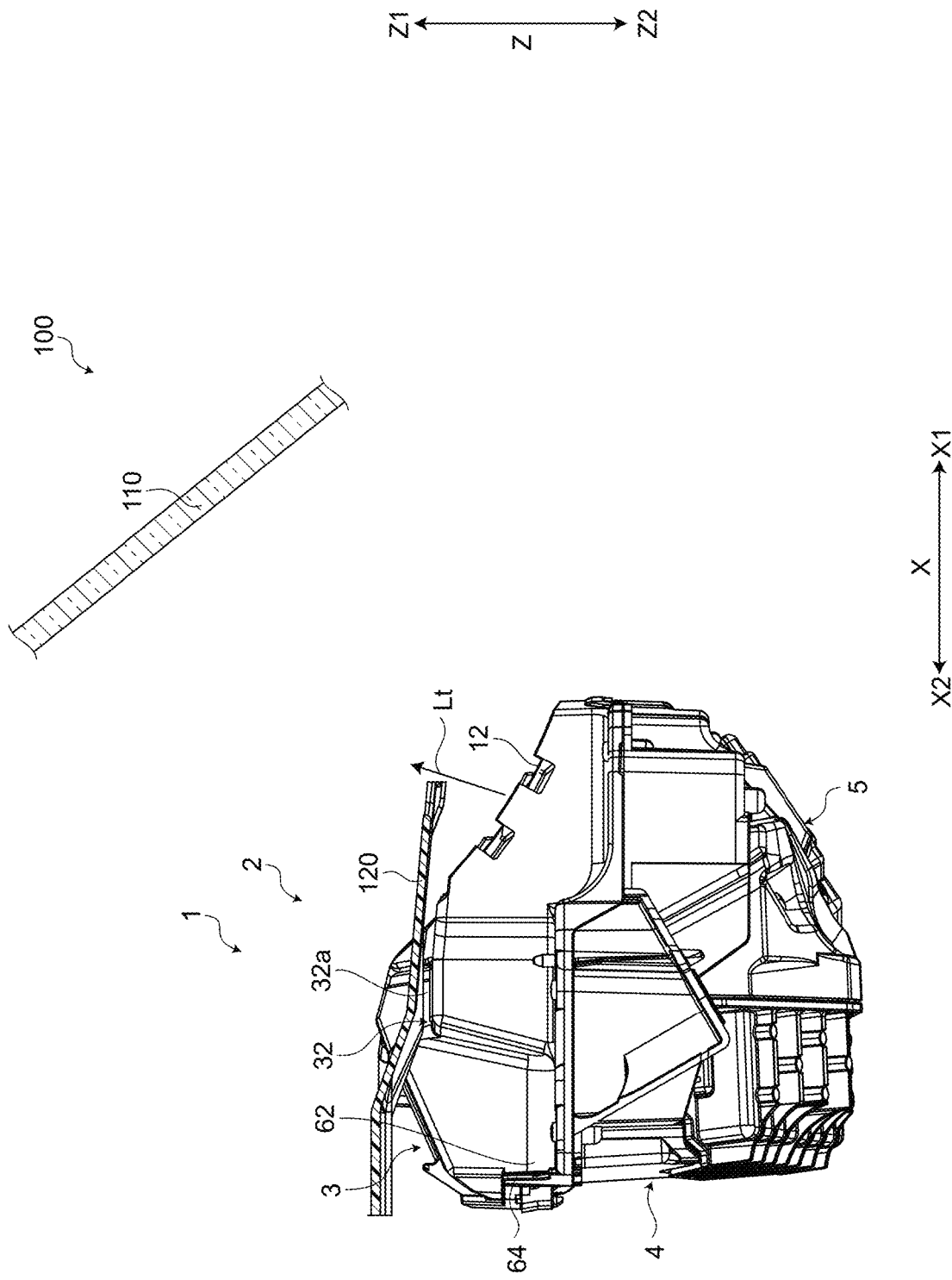
FIG. 4 is a side view illustrating the vehicle display device according to the embodiment.
Figure 5:
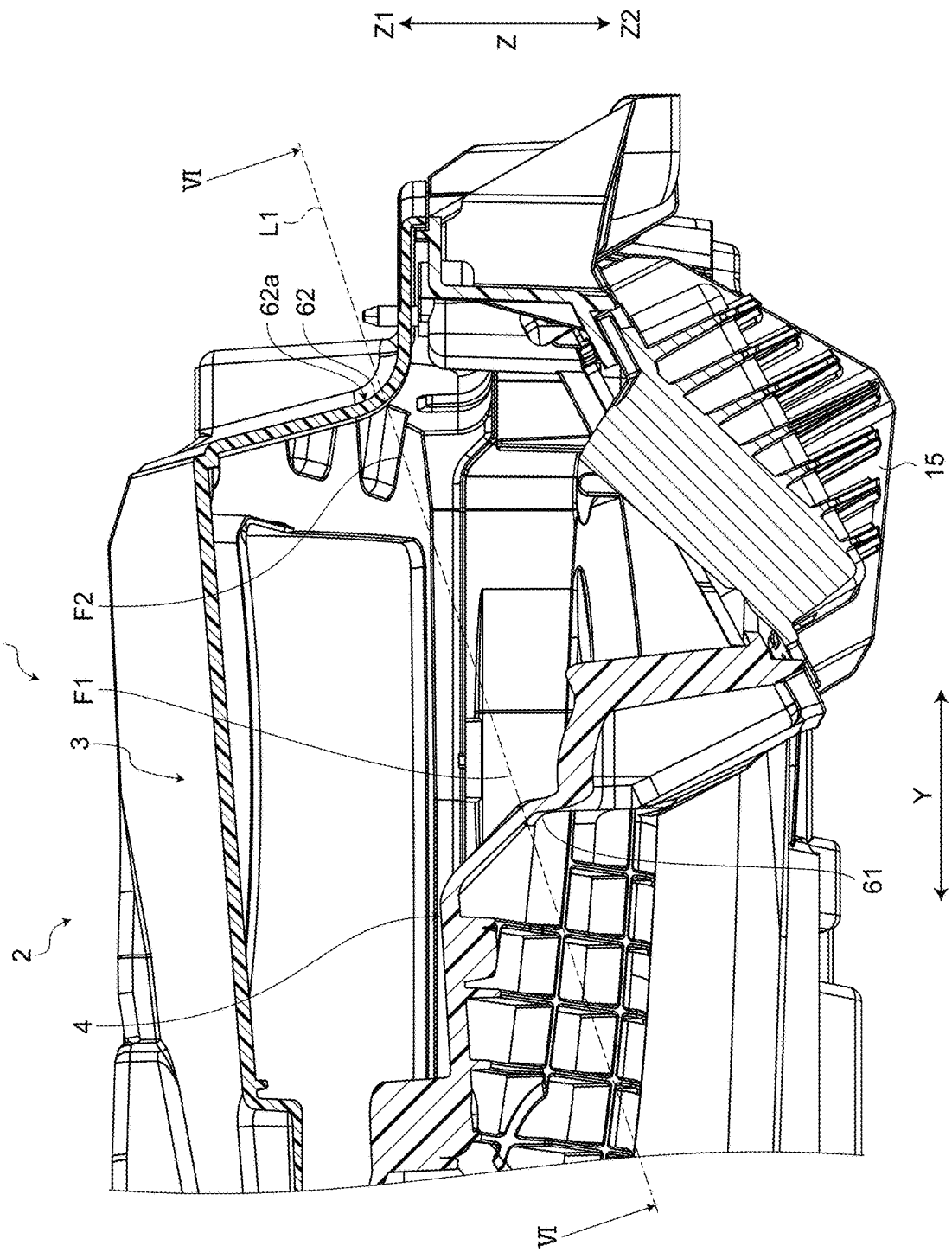
FIG. 5 is a cross-sectional view illustrating the vehicle display device according to the embodiment.
Figure 6:
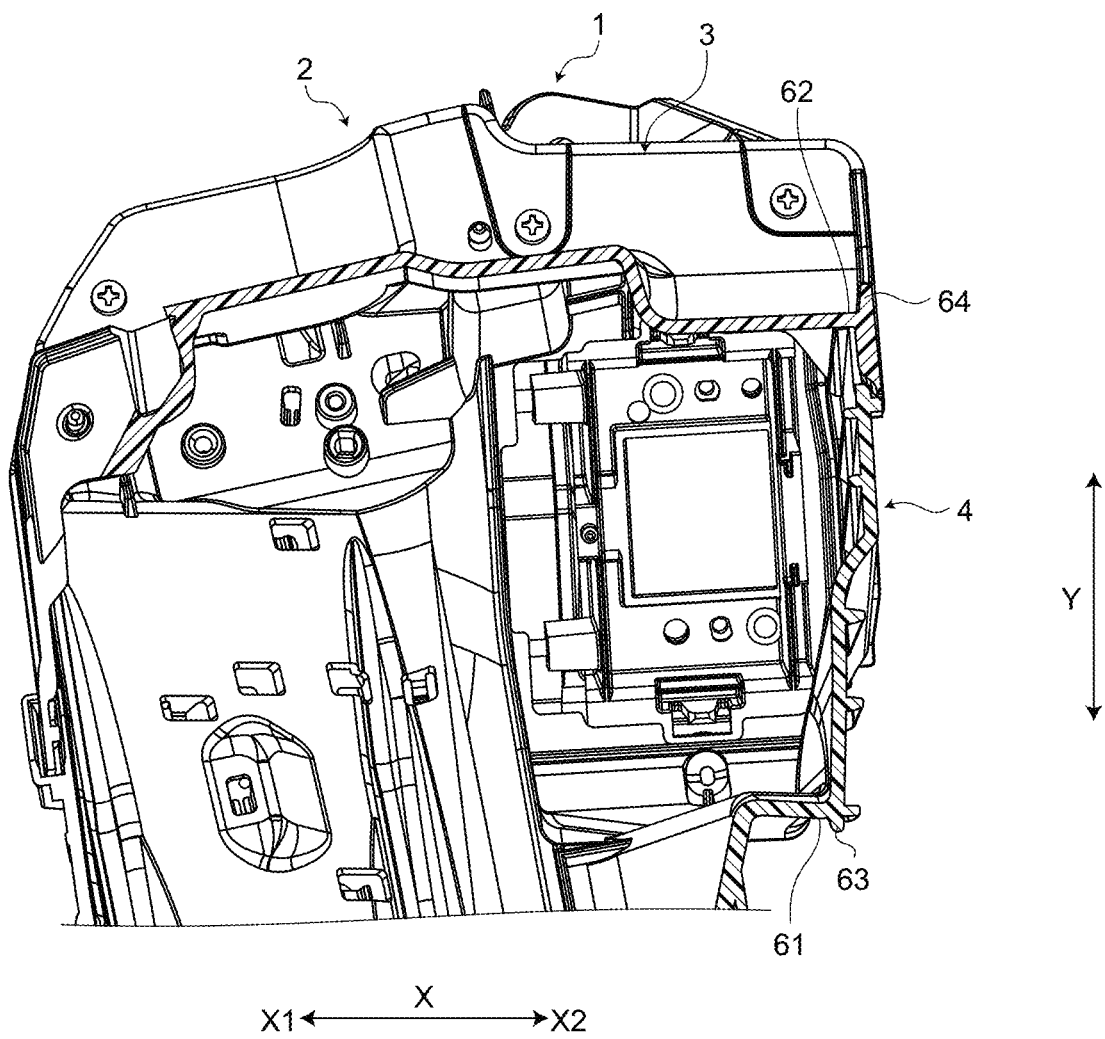
FIG. 6 is a cross-sectional view illustrating the vehicle display device according to the embodiment.
Figure 7:
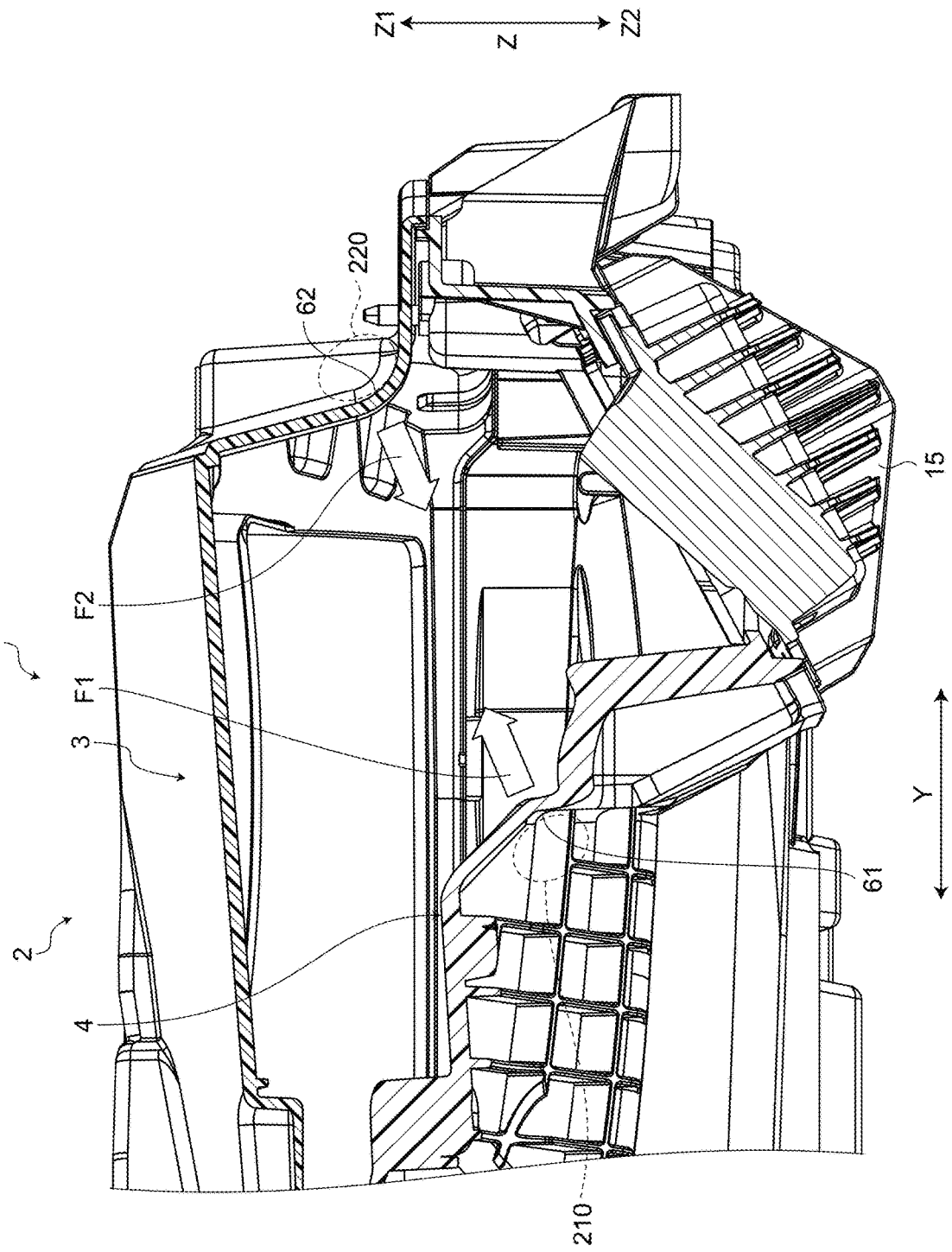
FIG. 7 is a cross-sectional view illustrating a pinch part that is pinched by an operator.
Figure 8:
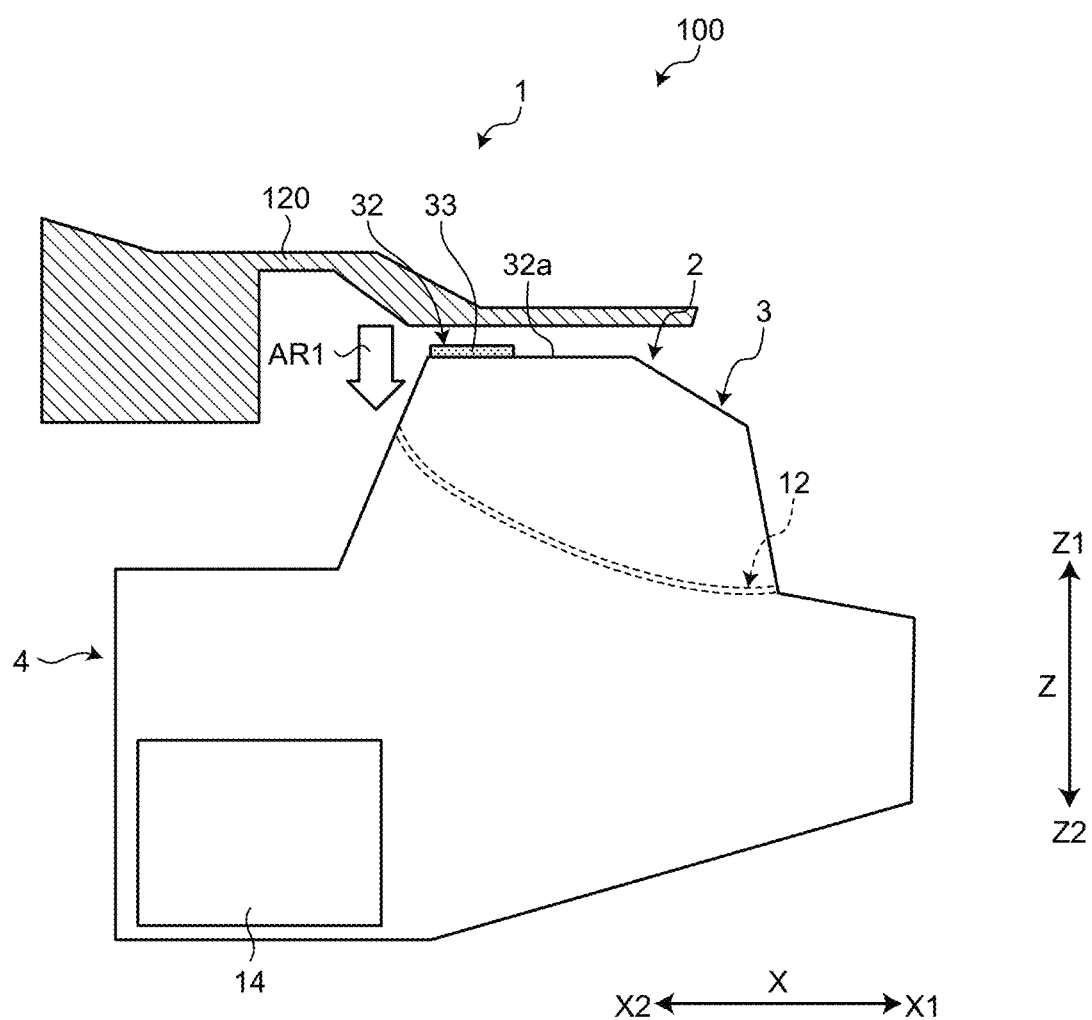
FIG. 8 is a cross-sectional view illustrating the vehicle display device and an instrument panel according to the embodiment.
Figure 9:
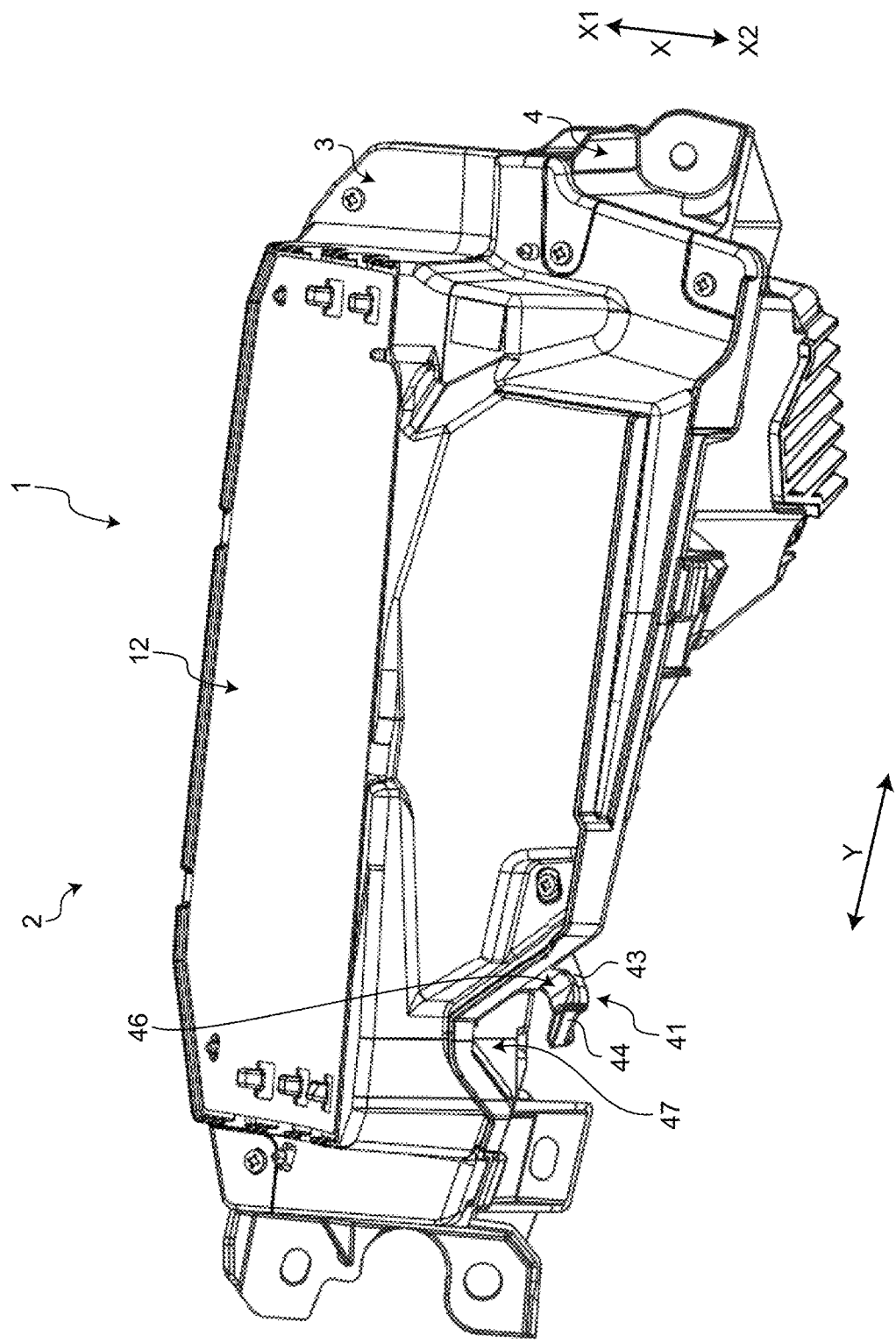
FIG. 9 is a perspective view illustrating a hook part according to the embodiment.
Figure 10:
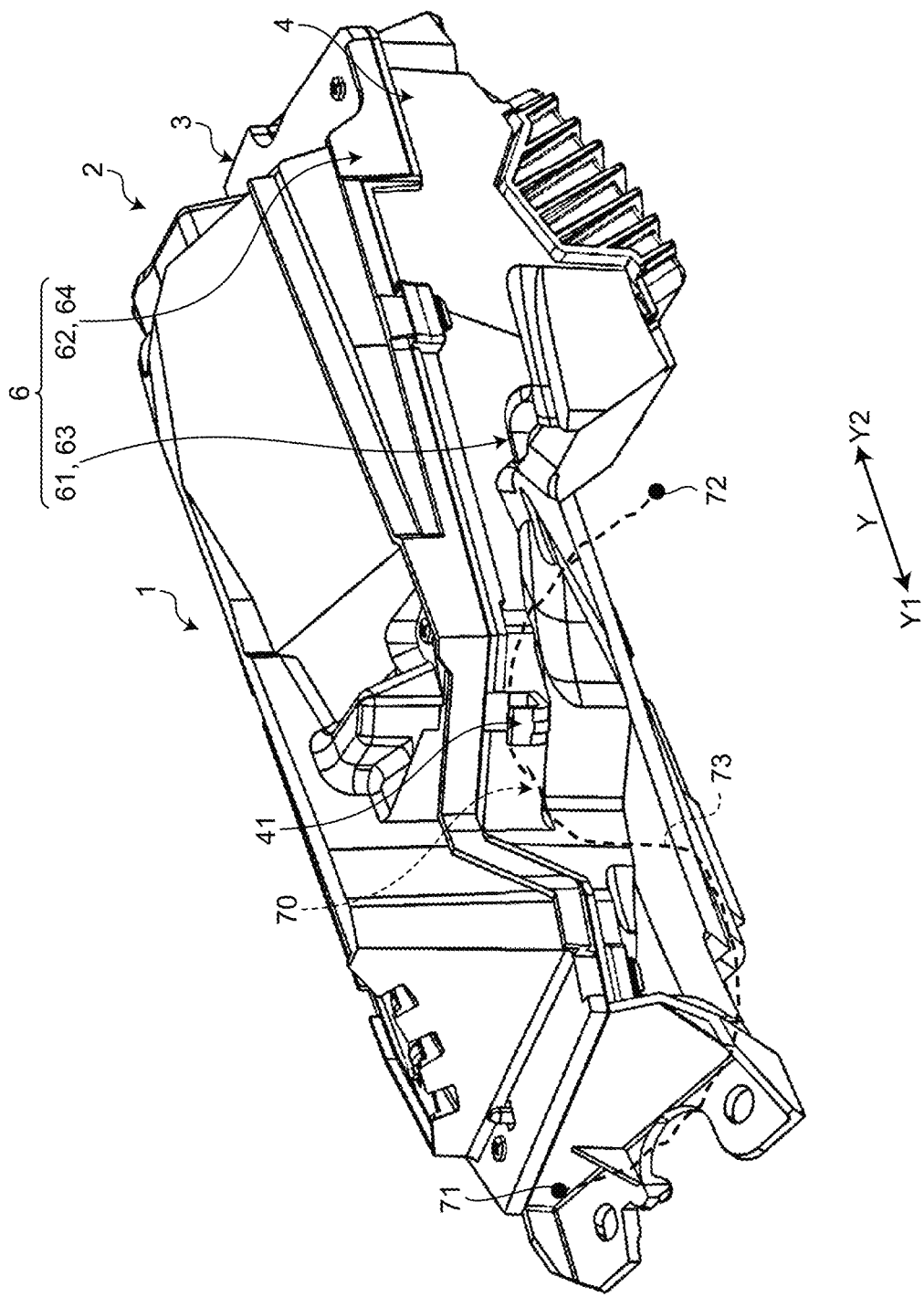
FIG. 10 is a diagram illustrating a wire harness temporarily placed on the hook part.

An embodiment will be described with reference to FIGS. 1 to 10. The present embodiment relates to a vehicle display device. FIG. 1 is a perspective view illustrating the vehicle display device according to the embodiment, FIG. 2 is a front view illustrating the vehicle display device according to the embodiment, FIG. 3 is a perspective view illustrating the vehicle display device according to the embodiment, FIG. 4 is a side view illustrating the vehicle display device according to the embodiment; FIGS. 5 and 6 are each a cross-sectional view illustrating the vehicle display device according to the embodiment, FIG. 7 is a cross-sectional view illustrating a pinch part that is pinched by an operator, FIG. 8 is a cross-sectional view illustrating the vehicle display device and an instrument panel according to the embodiment, FIG. 9 is a perspective view illustrating a hook part according to the embodiment, and FIG. 10 is a diagram illustrating a wire harness temporarily placed on the hook part. In FIG. 6, the VI-VI cross-section of FIG. 5 is illustrated.

As illustrated in FIGS. 1 to 4, a vehicle display device 1 of the present embodiment includes a housing 2, an image display device 11, a transparent cover 12, a substrate 13, and a backlight unit 14. The vehicle display device 1 is mounted in a vehicle 100, such as an automobile. The vehicle display device 1 is a so-called head-up display device, which projects display light Lt to a reflective part such as a windshield 110. The display light Lt is reflected by the reflective part such as the windshield 110 toward a driver of the vehicle 100. The driver visually recognizes a virtual image formed by the display light reflected by the windshield 110 and the like.

The housing 2 includes an upper case 3, a lower case 4, and a lower cover 5. The upper case 3, the lower case 4, and the lower cover 5 are molded with an insulating synthetic resin, for example. The upper case 3 and the lower case 4 constitute a case body that houses components such as the image display device 11 and a mirror. The lower case 4 is a bottomed, square cylindrical member with an opening that engages with the upper case 3. The lower case 4 has a securing part 45 that is secured to a vehicle body of the vehicle 100. The lower case 4 is secured to the vehicle 100 with the opening facing an upper side Z1 in a vertical direction Z of the vehicle.

As illustrated in FIG. 2, the lower case 4 retains and houses the image display device 11. The image display device 11 may be a liquid crystal display such as a thin film transistor-liquid crystal display (TFT-LCD). The backlight unit 14 is disposed on the back side of the image display device 11. A heat sink 15 that covers the backlight unit 14 is attached to the lower case 4.

The upper case 3 engages with the lower case 4 to cover the opening of the lower case 4. The shape of the upper case 3 is a square cylindrical shape along a vertical direction Z of the vehicle. The upper case 3 includes an opening 31 through which the image display light Lt passes. As illustrated in FIG. 3, the housing 2 is attached to the vehicle 100 with the opening 31 facing the upper side Z1 in the vertical direction Z of the vehicle. The opening 31 is inclined to face diagonally forward of the vehicle 100.

The lower cover 5 retains the substrate 13 and is attached to the lower case 4. As illustrated in FIG. 3, the lower cover 5 includes a retention part 51 that covers the substrate 13 from below. The retention part 51 covers electric wires that connect the substrate 13 to the image display device 11 from below to protect the electric wires. The retention part 51 is provided with a mating part 52 with which a connector is mated. As illustrated in FIG. 1, the mating part 52 has a square cylindrical shape into which the connector can be inserted.

The cover 12 is a transparent member that transmits the image display light Lt. The cover 12 is molded with, for example, a transparent resin such as polycarbonate. As illustrated in FIG. 3, the cover 12 is fixed to the upper case 3 so as to cover the opening 31 of the upper case 3 and block the opening 31. The display light Lt generated by the image display device 11 and the backlight unit 14 is reflected by the mirror toward the opening 31. The display light Lt passes through the cover 12 and is projected onto the windshield 110 and the like.

As illustrated in FIGS. 1 and 2, the housing 2 has a pinch part 6 that is pinched by the operator. More specifically, the pinch part 6 is pinched and gripped by the operator when the housing 2 is fixed to the vehicle body of the vehicle 100. The pinch part 6 is configured to be pinched by one hand of the operator. The pinch part 6 is provided on a first wall 20 of the housing 2.

The first wall 20 is one of square cylindrical side walls included in the housing 2. The housing 2 is attached to the vehicle 100 with the first wall 20 facing the rear side of the vehicle in a front-rear direction X. The shape of the first wall 20 when viewed from the rear side of the vehicle in the front-rear direction X is approximately rectangular. With the housing 2 attached to the vehicle 100, the longitudinal direction of the first wall 20 is a width direction Y of the vehicle. The lateral direction of the first wall 20 is a vertical direction Z of the vehicle. Part of the first wall 20 is a wall 30 included in the upper case 3, and the other part is a wall 40 included in the lower case 4.

The pinch part 6 includes a first recessed portion 61, a second recessed portion 62, a first rib 63, and a second rib 64. The first recessed portion 61 and first rib 63 are disposed on the wall 40 of the lower case 4. The second recessed portion 62 and second rib 64 are disposed on the wall 30 of the upper case 3.

As illustrated in FIG. 2, the first recessed portion 61 and the second recessed portion 62 are spaced apart in the direction of an imaginary line L1. The imaginary line L1 is a straight line along the first wall 20. The imaginary line L1 intersects the front-rear direction X of the vehicle. For example, the imaginary line L1 is orthogonal to the front-rear direction X of the vehicle. The illustrated imaginary line L1 is inclined with respect to both the width direction Y of the vehicle and the vertical direction Z of the vehicle. The first recessed portion 61 is positioned closer to the center of the housing 2 in the width direction Y of the vehicle than the second recessed portion 62 is. In other words, the second recessed portion 62 is positioned at a relative end side of the width direction Y of the vehicle to the first recessed portion 61. The first recessed portion 61 is also positioned closer to a lower side Z2 in the vertical direction Z of the vehicle than the second recessed portion 62 is.

FIG. 5 is a cross-sectional view illustrating the housing 2 in a cross-section perpendicular to the front-rear direction X of the vehicle. As illustrated in FIGS. 1 and 5, the first recessed portion 61 is recessed along the imaginary line L1 toward the second recessed portion 62. The cross-sectional shape in the cross-section of the first recessed portion 61 illustrated in FIG. 5 is a convexly bent shape toward the second recessed portion 62. The first recessed portion 61 is composed of two intersecting sides. The internal angle at a bent portion where the two sides intersect with each other is an obtuse angle.

As illustrated in FIGS. 3 and 5, the second recessed portion 62 is recessed along the imaginary line L1 toward the first recessed portion 61. As illustrated in FIG. 5, the second recessed portion 62 includes a curved portion 62*a*. The curved portion 62*a* is disposed at the center of the second recessed portion 62. The shape of the curved portion 62*a* is a convexly curved shape toward the first recessed portion 61. The shape of the curved portion 62*a* may be an arc shape. Both end portions of the second recessed portion 62 extend in a straight line along the tangential direction from both ends of the curved portion 62*a*.

As illustrated in FIG. 1, the first rib 63 is a linear rib provided adjacent to the first recessed portion 61. As illustrated in FIG. 6, the first rib 63 is disposed closer to a rear side X2 in the front-rear direction X of the vehicle than the first recessed portion 61 is. In other words, when viewed from the rear side X2 in the front-rear direction X of the vehicle, the first rib 63 is disposed in front of the first recessed portion 61. The first rib 63 extends along an edge of the first recessed portion 61 on the rear side X2. The first rib 63 protrudes with respect to the first recessed portion 61 toward the opposite side to the second recessed portion 62 side. The first rib 63 acts as an anti-slip when the operator's finger grasps the first recessed portion 61.

As illustrated in FIG. 3, the second rib 64 is a linear rib provided adjacent to the second recessed portion 62. As illustrated in FIG. 6, the second rib 64 is disposed closer to the rear side X2 in the front-rear direction X of the vehicle than the second recessed portion 62 is. In other words, when viewed from the rear side X2 in the front-rear direction X of the vehicle, the second rib 64 is disposed in front of the second recessed portion 62. The second rib 64 extends along an edge of the second recessed portion 62 on the rear side X2. The second rib 64 protrudes with respect to the second recessed portion 62 toward the opposite side to the first recessed portion 61 side. The second rib 64 acts as an anti-slip when the operator's fingers grasp the second recessed portion 62.

When attaching the housing 2 to the vehicle 100, the operator pinches the pinch part 6 of the housing 2 from the rear side X2. The housing 2 of the present embodiment is held by, for example, the operator's right hand. In this case, the operator presses against the first recessed portion 61 by a finger 210 of the right hand and presses against the second recessed portion 62 by another finger 220 of the right hand, as illustrated in FIG. 7. The finger 210 may be a thumb. The other finger 220 may be an index or a middle finger, may be both the index and the middle fingers, or any other finger.

The finger 210 applies a force F1 toward the second recessed portion 62 against the first recessed portion 61. The finger 220 applies a force F2 toward the first recessed portion 61 against the second recessed portion 62. The operator can hold the housing 2 stably by the forces F1 and F2 for pinching the pinch part 6. The first recessed portion 61 is recessed so that a position of the finger 210 is more stable, and the second recessed portion 62 is recessed so that a position of the finger 220 is more stable. When the operator pinches the pinch part 6, the first rib 63 serves as an anti-slip for the finger 210, and the second rib 64 serves as an anti-slip for the finger 220.

In the present embodiment, the first recessed portion 61 and the second recessed portion 62 are aligned in a direction inclined to the width direction Y of the vehicle. The first recessed portion 61 is disposed closer to the lower side Z2 than the second recessed portion 62 is. Such a disposition allows the operator to hold the housing 2 easily in the horizontal attitude. The operator can hold the housing 2 stably with one hand while performing various kinds of work with the other hand. Therefore, the vehicle display device 1 of the present embodiment can improve the workability of an assembling the housing 2 to the vehicle 100.

The housing 2 of the present embodiment also includes a support 32 that can temporarily support an instrument panel 120 of the vehicle 100. The support 32 includes a support surface 32a facing the upper side Z1 in the vertical direction Z of the vehicle, as illustrated in FIG. 3. The support surface 32a is a flat surface. The support 32 in the present embodiment is part of the upper case 3 and is raised toward the upper side Z1 with respect to the lower case 4. The support 32 is raised toward the upper side Z1 with respect to the periphery of the support 32. The support 32 is disposed adjacent to the opening 31, for example.

A pad 33 is disposed on the exemplified support surface 32a. The pad 33 is a sheet-like elastic member. The pad 33 may be formed of rubber. As illustrated in FIG. 8, the housing 2 is covered by the instrument panel 120 from the upper side Z1. The attachment of the instrument panel 120 to the vehicle 100 is carried out after the housing 2 is secured to the vehicle 100. The instrument panel 120 is temporarily placed on the top of the housing 2 to cover the housing 2. The instrument panel 120 that has been temporarily placed may be warped and deformed toward the lower side Z2 as illustrated by arrow AR1.

The support surface 32a of the support 32 is disposed to be able to support the instrument panel 120 that is warped toward the lower side Z2. The pad 33 can protect the support surface 32a when the instrument panel 120 is brought into contact with the support 32. The pad 33 also acts as an anti-slip for the instrument panel 120. The support 32 can prevent damage to the vehicle display device 1 due to the instrument panel 120 being brought into contact with a different part from the support 32.

The housing 2 of the present embodiment also includes a hook part 41 that temporarily retains an electric wire. As illustrated in FIG. 1, the hook part 41 is disposed on a wall 42 of the lower case 4. The wall 42 is adjacent to the first wall 20 in the width direction Y of the vehicle. More specifically, the wall 42 is disposed on the opposite side to the second recessed portion 62 side with respect to the first wall 20. The wall 42 is inclined with respect to the width direction Y of the vehicle. The inclination direction of the wall 42 is toward a front side X1 in the front-rear direction X of the vehicle as the distance from the pinch part 6 increases along the width direction Y of the vehicle. In other words, when the housing 2 is viewed from the rear side X2 in the front-rear direction X of the vehicle, the wall 42 is disposed on the inner side than on the first wall 20. Owing to the inclination of the wall 42, in the housing 2, a recessed portion 47 is formed to be recessed in a V-shape toward the front side X1. The hook part 41 is disposed on this recessed portion 47. Accordingly, interference between the hook part 41 and surrounding members is less likely to occur.

As illustrated in FIG. 9, the hook part 41 includes a base portion 43 and a tip portion 44. The base portion 43 protrudes from the wall 42 of the housing 2. The protrusion direction of the base portion 43 is a direction orthogonal to the wall 42. The tip portion 44 protrudes from the tip of the base portion 43 toward the upper side Z1. The tip portion 44 faces the wall 42 of the housing 2. A path 46 through which an electric wire passes is formed between the tip portion 44 and the wall 42. The tip portion 44 supports the electric wire placed on the base portion 43 from the side. The exemplified tip portion 44 extends in the width direction Y of the vehicle and forms the tapered path 46. The width of the exemplified path 46 is narrowed toward the rear side X2 in the front-rear direction X of the vehicle. The hook part 41 with such a path 46 can engage with a connector at an end portion of the path 46 on the rear side X2.

FIG. 10 illustrates a wire harness 70 supported by the hook part 41. The wire harness 70 includes a first connector 71, a second connector 72, and an electric wire 73. The electric wire 73 connects the vehicle display device 1 to an external device, and is a signal wire, for example. The first connector 71 is connected to one end of the electric wire 73, and the second connector 72 is connected to the other end of the electric wire 73. The first connector 71 is mated with the mating part 52 of the lower cover 5 and connected to the substrate 13.

As illustrated in FIG. 1, the mating part 52 is disposed on a first side Y1 in the housing 2, and the pinch part 6 is disposed on a second side Y2. The first side Y1 and the second side Y2 are the left side and the right side when viewed from the rear side X2 in the front-rear direction X of the vehicle. By adopting such a disposition, the operator can insert the first connector 71 into the mating part 52 with the left hand while pinching the pinch part 6 with the right hand. The mating part 52 of the present embodiment opens toward the first side Y1. Thus, the operator can easily mate the first connector 71 with the mating part 52.

The second connector 72 is connected to an external device. The external device is housed in the instrument panel 120, and is a meter device, for example. The second connector 72 is connected to the external device after the housing 2 is attached to the vehicle 100. As illustrated in FIG. 10, the electric wire 73 is supported by the hook part 41. The electric wire 73 may be wrapped around the hook part 41. An end portion of the electric wire 73 on the second connector 72 side may be hooked onto the hook part 41, and the second connector 72 may be placed on the hook part 41. The hook part 41 retains the wire harness 70 with the electric wire 73 and second connector 72 laid along the housing 2. Therefore, the workability of an attachment of the housing 2 to the vehicle 100 is improved.

As described above, the vehicle display device 1 of the present embodiment includes the housing 2, the image display device 11, and the transparent cover 12. The housing 2 includes the opening 31 and the first wall 20. The housing 2 is attached to the vehicle 100 in an orientation in which the opening 31 faces the upper side Z1 in the vertical direction Z of the vehicle, and the first wall 20 faces the rear side X2 in the front-rear direction X of the vehicle. The image display device 11 is housed in the housing 2. The cover 12 blocks the opening 31 and allows the display light Lt emitted from the image display device 11 to be transmitted from the inside to the outside of the housing 2.

The first wall 20 includes the pinch part 6 that is pinched by one hand of the operator. The pinch part 6 includes the first recessed portion 61 and the second recessed portion 62, which are spaced apart from each other in one direction along the first wall 20. The first recessed portion 61 is recessed toward the second recessed portion 62 along this one direction. The second recessed portion 62 is recessed toward the first recessed portion 61 along this one direction. In the vehicle display device 1 of the present embodiment, the housing 2 includes the pinch part 6 that is pinched by one hand. The fact that the housing 2 can be easily grasped by one hand improves the workability during the attachment of the housing 2 to the vehicle 100.

At least one recessed portion of the first recessed portion 61 and the second recessed portion 62 may be recessed in an arc-shape. For example, the second recessed portion 62 in the present embodiment is recessed in the arc-shape. Thus, when the operator's finger 220 presses the second recessed portion 62, the position of the finger 220 is stabilized.

The housing 2 of the present embodiment includes the first rib 63 and the second rib 64. The first rib 63 is a linear rib extending along an edge of the first recessed portion 61 on the rear side X2 in the front-rear direction X of the vehicle and protrudes with respect to the first recessed portion 61 toward the opposite side to the second recessed portion 62 side. The second rib 64 is a linear rib extending along an edge of the second recessed portion 62 on the rear side X2 in the front-rear direction X of the vehicle and protrudes with respect to the second recessed portion 62 toward the opposite side to the first recessed portion 61 side. Each of the first rib 63 and the second rib 64 acts as an anti-slip for the operator's fingers. Finger pads or finger joints of the operator are pressed against the first rib 63 and the second rib 64.

One of the above-described directions of the present embodiment is a direction along the imaginary line L1, which is inclined to the width direction Y of the vehicle. The first recessed portion 61 is positioned closer to the center of the housing 2 in the width direction Y of the vehicle than the second recessed portion 62 is, and positioned closer to the lower side Z2 in the vertical direction Z of the vehicle than the second recessed portion 62 is. Such a disposition makes it easier for the operator to hold the housing 2 in a case in which the operator's thumb is placed against the first recessed portion 61 and the other finger is placed against the second recessed portion 62.

In the vehicle display device 1 of the present embodiment, the first recessed portion 61 is positioned closer to the center of the housing 2 in the width direction Y of the vehicle than the second recessed portion 62 is. The housing 2 includes the mating part 52 with which the connector is mated. The mating part 52 is disposed on the opposite side to the second recessed portion 62 side with respect to the first recessed portion 61. Such a disposition makes it easier for the operator to pinch the pinch part 6 with one hand while mating the connector with the mating part 52 with the other hand.

As illustrated in FIG. 4 and other figures, the housing 2 attached to the vehicle 100 is covered by the instrument panel 120 from the upper side Z1 in the vertical direction Z of the vehicle. The housing 2 includes the flat support surface 32a, which can support the instrument panel 120 from below. The support surface 32a can support the instrument panel 120 in a case in which the instrument panel 120 is temporarily placed. Thus, the support surface 32a can prevent the instrument panel 120 from interfering with a different part from the support surface 32a. Providing the support surface 32a eliminates the need for a cover member or other components to protect the housing 2 from the instrument panel 120. Thus, the vehicle display device 1 can be downsized, the space where the vehicle display device 1 is mounted in the vehicle 100 can be reduced, and the number of parts can be reduced.

The vehicle display device 1 of the present embodiment includes the substrate 13 that is housed in the housing 2. The housing 2 includes the hook part 41 that supports the electric wire 73 connected to the substrate 13. The electric wire 73 is supported by the hook part 41, which improves the workability during the attachment of the housing 2 to the vehicle 100.

The alignment direction of the two recessed portions 61 and 62 on the pinch part 6 is not limited to the direction along the imaginary line L1 illustrated in the present embodiment. For example, the two recessed portions 61 and 62 may be disposed side by side in the width direction Y of the vehicle.

The disposition of the pinch part 6 in the housing 2 is not limited to the disposition of the present embodiment. For example, the pinch part 6 may be disposed on the center or left side in the housing 2 when viewed from the rear side X2 in the front-rear direction X of the vehicle. In this case, the pinch part 6 illustrated in FIG. 2 may be disposed on the center or left side of the housing 2 as it is. Alternatively, the pinch part 6 illustrated in FIG. 2 may be left-and-right reversed.

Modification of Embodiment

Figure 11:
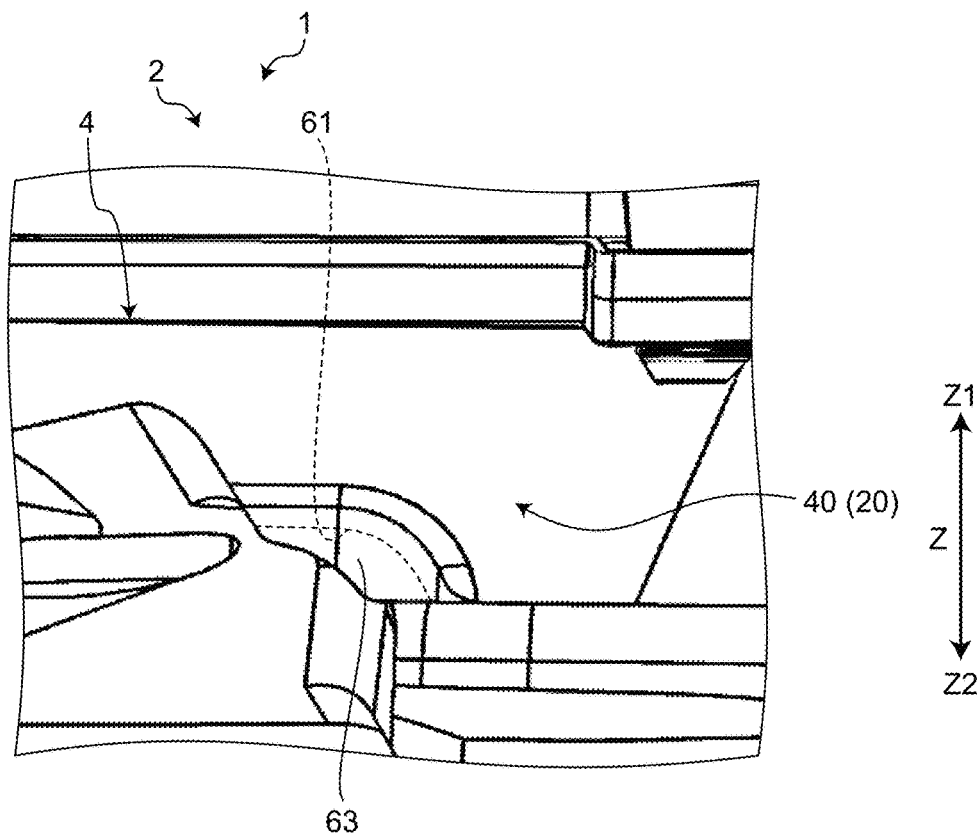
FIG. 11 is a diagram illustrating a modification of a first recessed portion and a first rib.
Figure 12:
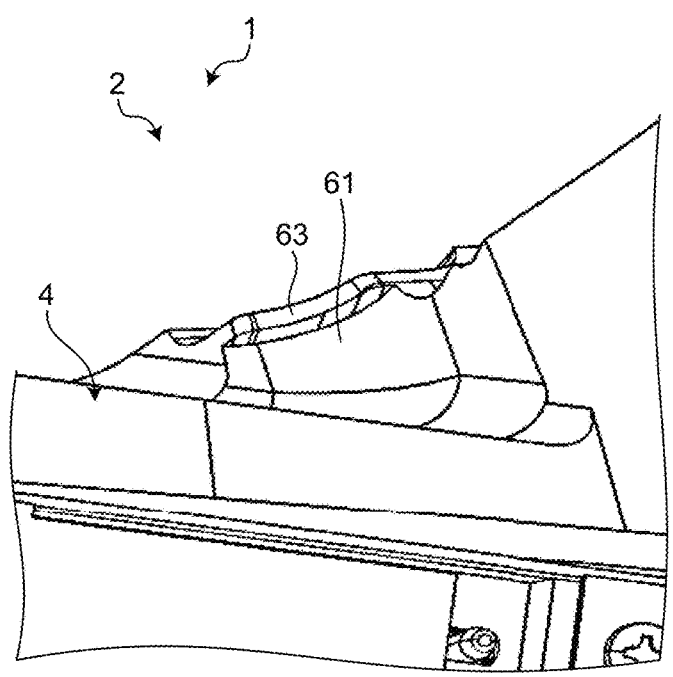
FIG. 12 is a diagram illustrating the modification of the first recessed portion and the first rib.
Figure 14:
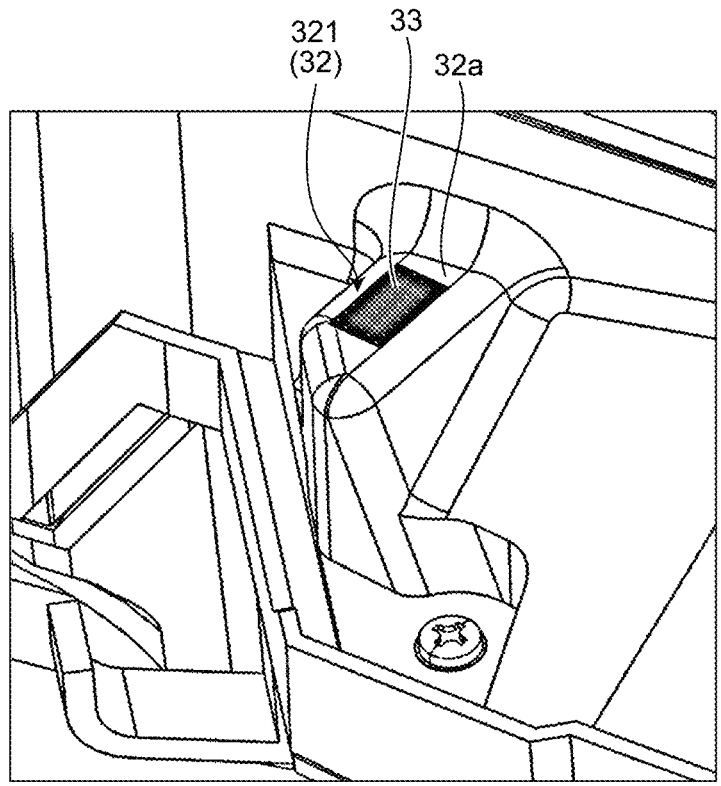
FIG. 14 is a diagram illustrating a supporting part according to the modification.
Figure 15:
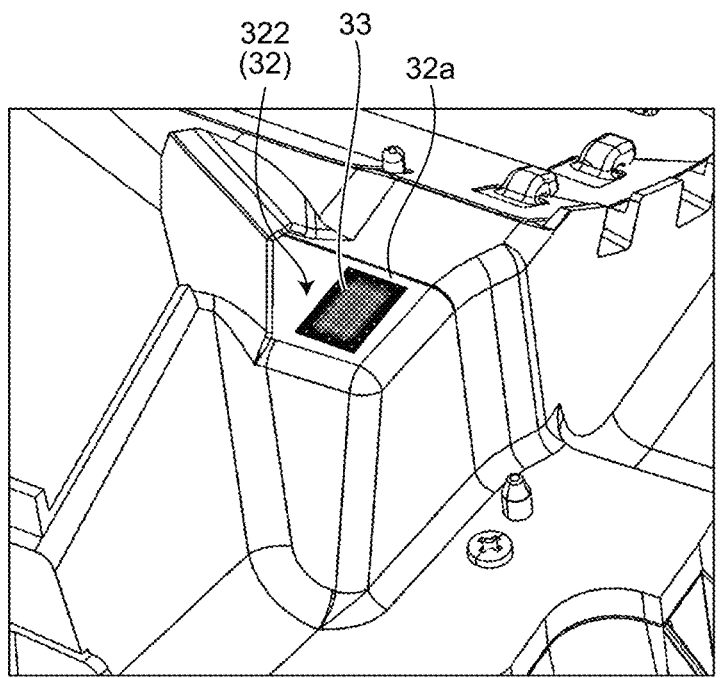
FIG. 15 is a diagram illustrating a supporting part according to the modification.

A modification of the embodiment will be described with reference to FIGS. 11 to 16. FIGS. 11 and 12 are diagrams illustrating a modification of the first recessed portion and the first rib, FIGS. 13 to 15 are diagrams illustrating the support of the modification, and FIG. 16 is a diagram illustrating the hook part according to the modification.

The shape and disposition of the pinch part 6 are not limited to the shape and disposition illustrated in the embodiment. For example, the shapes of the first recessed portion 61 and the first rib 63 may be curved shapes. FIG. 11 illustrates the first recessed portion 61 and the first rib 63 as viewed from the rear side X2 in the front-rear direction X of the vehicle. FIG. 12 is a perspective view of the first recessed portion 61 and the first rib 63 as viewed from the lower side Z2 in the vertical direction Z of the vehicle. As illustrated in FIGS. 11 and 12, the first recessed portion 61 is a curved surface having a curved shape.

The first rib 63 is disposed on the rear side X2 with respect to the first recessed portion 61 and adjacent to the first recessed portion 61. A tip surface of the first rib 63 has a curved shape corresponding to the first recessed portion 61. The curved shape of the first recessed portion 61 and first rib 63 may be an arc shape. The first recessed portion 61 and first rib 63 having the curved shape enable contact with the finger 210 with a large contact area, and the operator to hold the housing 2 easily.

Figure 13:
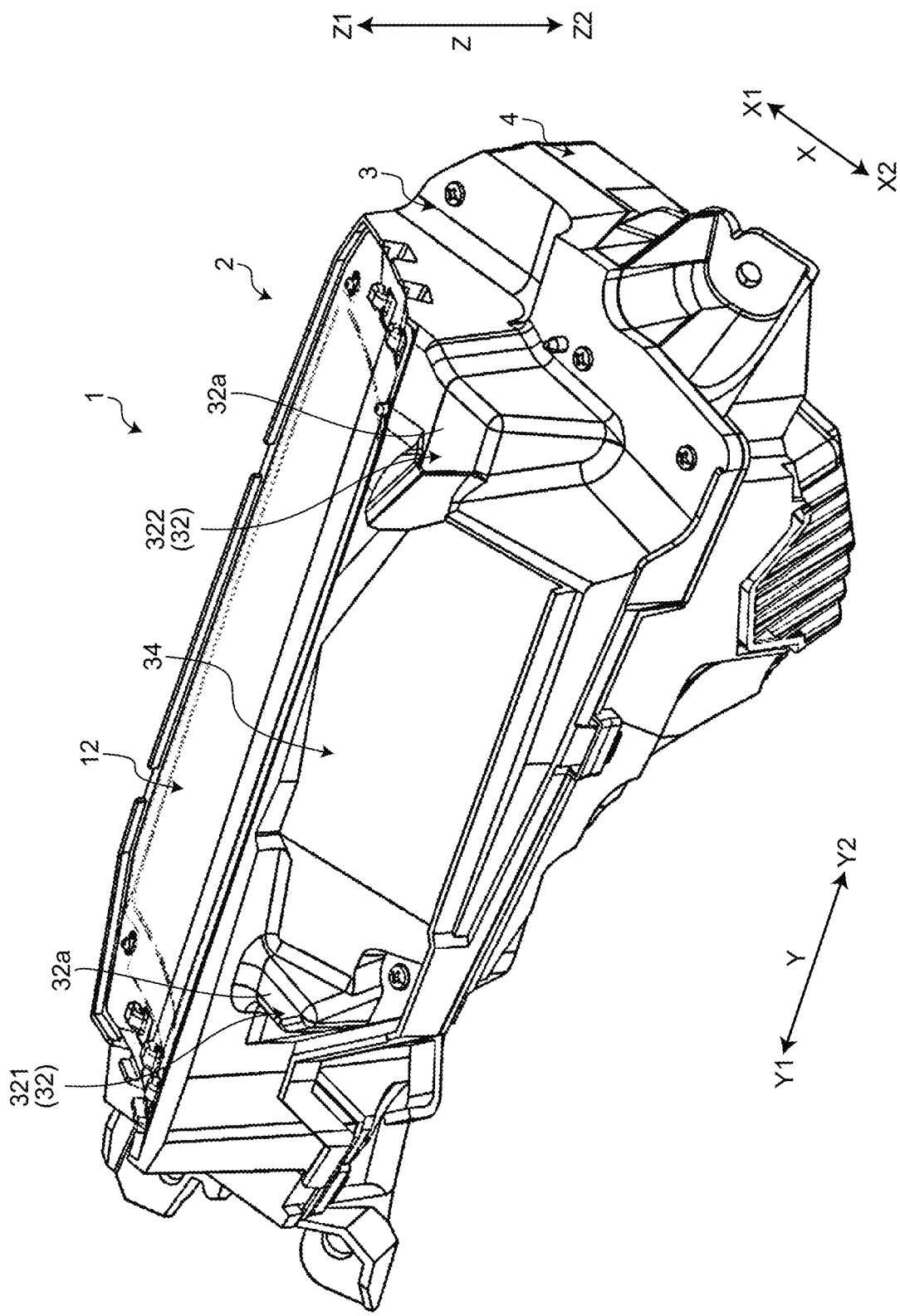
FIG. 13 is a diagram illustrating a supporting part according to the modification.

The housing 2 illustrated in FIG. 13 includes a plurality of the supports 32. The supports 32 include a first support 321 and a second support 322. The first support 321 and the second support 322 are both disposed on the rear side X2 in the front-rear direction X of the vehicle with respect to the transparent cover 12. The first support 321 and the second support 322 are spaced apart from each other in the width direction Y of the vehicle. The first support 321 and the second support 322 are raised toward the upper side Z1 of the vertical direction Z of the vehicle with respect to a part 34 between the two supports 32. Such raised supports 32 can prevent the instrument panel 120 from contacting with different parts from the supports 32. The support 32 minimizes flexure deformation of the instrument panel 120 and improves the workability of the attachment of the instrument panel 120 to the vehicle 100.

As illustrated in FIG. 14, the pad 33 may be disposed on the support surface 32a of the first support 321. As illustrated in FIG. 15, the pad 33 may be disposed on the support surface 32a of the second support 322.

The hook part 41 illustrated in FIG. 16 protrudes from the wall 42 of the lower case 4, similar to the hook part 41 in the above-described embodiment, and includes the base portion 43 and the tip portion 44. The base portion 43 illustrated in FIG. 16 protrudes from the wall 42, similar to the base portion 43 in the above-described embodiment. The tip portion 44 of the modification is parallel to the wall 42. In other words, the width of the path between the tip portion 44 and the wall 42 is constant. The shape of the tip portion 44 is set as appropriate according to an aspect in which the wire harness 70 is temporarily placed on the hook part 41.

The contents disclosed in the above-described embodiment and modification may be combined and implemented as appropriate.

The vehicle display device of the present embodiment includes the housing that is attached to the vehicle in an orientation in which the first wall faces the rear side in the front-rear direction of the vehicle. The first wall includes the pinch part that is pinched by one hand of the operator, and the pinch part includes the first recessed portion and the second recessed portion, which are spaced apart from each other in one direction along the first wall. The first recessed portion is recessed toward the second recessed portion along the one direction, and the second recessed portion is recessed toward the first recessed portion along the one direction. The vehicle display device of the present embodiment exhibits the effect of improving the workability during the attachment of the housing to the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a housing that includes an opening and a first wall, wherein the housing is attached to a vehicle in an orientation in which the opening faces an upper side in a vertical direction of the vehicle, and the first wall faces a rear side in a front-rear direction of the vehicle;
   an image display device that is housed in the housing; and
   a transparent cover that blocks the opening and allows display light emitted from the image display device to be transmitted from an inside to an outside of the housing, wherein
   the first wall includes a pinch part pinched by one hand of an operator,
   the pinch part includes a first recessed portion and a second recessed portion, which are spaced apart from each other in one direction along the first wall,
   the first recessed portion is recessed toward the second recessed portion along the one direction, and
   the second recessed portion is recessed toward the first recessed portion along the one direction.

2. The vehicle display device according to claim 1, wherein
   at least one of the first recessed portion and the second recessed portion is recessed in an arc-shape.

3. The vehicle display device according to claim 1, further comprising:
   a first linear rib that extends along an edge of the first recessed portion on the rear side in the front-rear direction of the vehicle and protrudes with respect to the first recessed portion toward an opposite side to the second recessed portion side; and
   a second linear rib that extends along an edge of the second recessed portion on the rear side in the front-rear direction of the vehicle and protrudes with respect to the second recessed portion toward an opposite side to the first recessed portion side.

4. The vehicle display device according to claim 1, wherein
   the one direction is inclined to a width direction of the vehicle, and
   the first recessed portion is positioned closer to a center of the housing in the width direction of the vehicle than the second recessed portion is, and positioned closer to a lower side in the vertical direction of the vehicle than the second recessed portion is.

5. The vehicle display device according to claim 1, wherein
   the first recessed portion is positioned closer to a center of the housing in a width direction of the vehicle than the second recessed portion is,
   the housing includes a mating part with which a connector is mated, and
   the mating part is disposed on an opposite side to the second recessed portion side with respect to the first recessed portion.

6. The vehicle display device according to claim 1, wherein
   the housing attached to the vehicle is covered by an instrument panel from the upper side in the vertical direction of the vehicle, and
   the housing includes a flat support surface capable of supporting the instrument panel from below.

7. The vehicle display device according to claim 1, further comprising:

a substrate housed in the housing, wherein
the housing includes a hook part that supports an electric wire connected to the substrate.

\* \* \* \* \*